United States Patent [19]

Furuyama et al.

[11] Patent Number: 4,744,804
[45] Date of Patent: May 17, 1988

[54] DUST PRE-REMOVAL METHOD IN A DRY MOVING BED TYPE ADSORPTION TOWER

[75] Inventors: Kuninori Furuyama, Tochigi; Yoshiro Ito, Chuo, both of Japan

[73] Assignees: Mitsui Mining Company, Limited; Mitsui Miike Engineering Corp., both of Tokyo, Japan

[21] Appl. No.: 6,247

[22] Filed: Jan. 9, 1987

Related U.S. Application Data

[63] Continuation of Ser. No. 896,587, Aug. 18, 1986, abandoned, which is a continuation of Ser. No. 699,397, Feb. 7, 1985, abandoned.

[30] Foreign Application Priority Data

Feb. 16, 1984 [JP] Japan .................................. 59-26154

[51] Int. Cl.⁴ ............................................. B01D 53/08
[52] U.S. Cl. ........................................... 55/60; 55/79; 55/96; 55/99; 55/390
[58] Field of Search ................... 55/34, 60, 77, 79, 96, 55/99, 181, 390, 474; 422/144, 145, 147, 178

[56] References Cited

U.S. PATENT DOCUMENTS

| 2,493,218 | 1/1950 | Bergstrom | 55/79 X |
| 2,673,832 | 3/1954 | Lassiat | 55/390 X |
| 2,992,065 | 7/1961 | Feustel et al. | 55/79 X |
| 3,067,131 | 12/1962 | Bergstrom | 55/474 X |
| 3,760,565 | 9/1973 | Fish | 55/79 X |
| 3,960,529 | 6/1976 | Juntgen et al. | 55/390 |
| 4,017,278 | 4/1977 | Reese | 55/96 |
| 4,083,701 | 4/1978 | Noack | 55/79 X |
| 4,203,736 | 5/1980 | Berz | 55/96 |
| 4,292,054 | 9/1981 | Noack et al. | 55/390 X |
| 4,306,886 | 12/1981 | Clyde | 55/27 |

FOREIGN PATENT DOCUMENTS

352081  4/1922  Fed. Rep. of Germany .

Primary Examiner—Robert Spitzer
Attorney, Agent, or Firm—Wenderoth, Lind & Ponack

[57] ABSTRACT

In a dry moving bed type adsorption tower using a granular adsorbent, for example, for removing $SO_x$ and $NO_x$ from waste gases, the granular adsorbent entering the adsorption tower is previously rinsed with a gas in a feed pipe for the adsorbent, thereby avoiding the need to install a dust collector at the outlet of the adsorption tower.

6 Claims, 8 Drawing Sheets

DUST PRE-REMOVAL METHOD IN A DRY MOVING BED TYPE ADSORPTION TOWER

This application is a continuation of now abandoned application Ser. No. 896,587, filed Aug. 18, 1986, which is a continuation of Ser. No. 699,397, filed Feb. 7, 1985, now abandoned.

BACKGROUND OF THE INVENTION

1. Field of the Invention

This invention relates to a dust pre-removal method in a dry moving bed type adsorption tower and more particularly, it is concerned with a method of reducing the dust concentration in a gas passing through a granular material bed in an apparatus for contacting a gas with a granular material, e.g. a dry moving bed type adsorption tower used for removal of $SO_x$ and $NO_x$ from waste gases.

2. Description of the Prior Art

Figure 1:
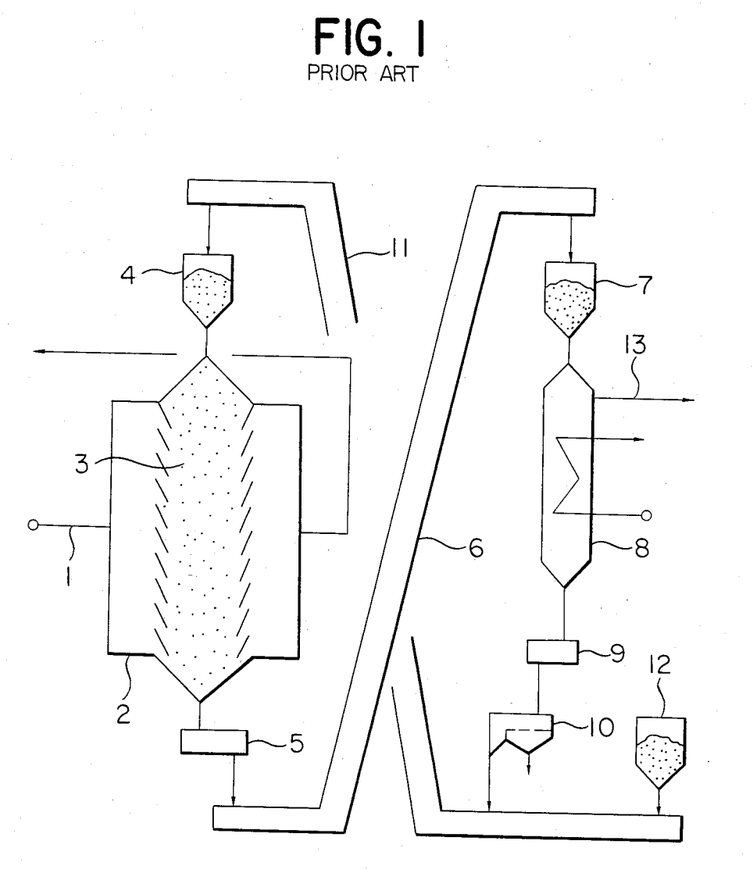
FIG. 1 is a schematic view of a flow diagram showing an ordinary $SO_x$ and $NO_x$ removal system of the prior art using an adsorption tower of dry moving bed type.

One example of a method for the removal of $SO_x$ and $NO_x$ using an ordinary $SO_x$ and $NO_x$ removal apparatus of dry moving bed type will now be illustrated by a flow sheet as shown in FIG. 1.

Waste gas 1 from boilers, etc. is introduced into adsorption tower 2, brought into contact with a granular carbonaceous adsorbent 3 packed and held in the tower, thus subjected to reactions for removal of $SO_x$ and $NO_x$ and to removal of dust and exhausted through a stack (not shown) in the air. On the other hand, carbonaceous adsorbent 3 is continuously withdrawn from the lower part of adsorption tower 2 by feeder 5 while holding a constant level of powder in hopper 4 over the upper part of adsorption tower 2 and thus forming a moving bed in adsorption tower 2, and $SO_2$ in the gas is adsorbed in the form of $H_2SO_4$ during the course of entering and leaving adsorption tower 2, while dusts and the like are also adsorbed. The adsorbent withdrawn from feeder 5 is then fed to hopper 7 for regeneration tower 8 by means of bucket conveyor 6, introduced into regeneration tower 8 while holding a constant level of powder in hopper 7 and continuously withdrawn therefrom by feeder 9. In regeneration tower 8, the adsorbent is heated to decompose $H_2SO_4$ adsorbed into $SO_2$ and thus released $SO_2$ gas 13 is fed to another plant for byproducts (not shown). The adsorbent withdrawn by feeder 9 is subjected to vibrating screen 10 where dusts in the waste gas and abrasive powders formed during movement, adhered to the adsorbent, are separated, and then returned to hopper 4 by means of bucket conveyor 11. Since the quantity of the adsorbent decreases due to the chemical reactions in regeneration tower 8, the withdrawal from vibrating screen 10 and the entrainment with the gas, the decreased adsorbent should be made up from make-up hopper 12.

A waste gas from a boiler or the like is ordinarily supplied to an adsorbing tower via a dust collector, but generally has a dust concentration of about 200-400 mg/Nm$^3$. The dust removal or dedusting capacity of an adsorption tower is generally so large that in a test of flowing a gas at a linear velocity of 0.15 Nm/sec through a moving bed with a thickness of 1.5 m using an adsorbent with a mean grain size of about 10 mm, for example, at the outlet of the adsorption tower, there is little dust having the same composition as that at the inlet thereof. However, the dust concentration itself at the outlet of an adsorption tower is not so small, the most part of which consists of a fine powder of carbonaceous adsorbent. Since the dust concentration of a waste gas exhausted in the air has severely been regulated independently of the dust composition, it is required, in order to overcome this regulation, to provide a dust collector even at the rear of an adsorption tower in many cases.

A fine powder of an adsorbent contained in an outlet gas of an adsorption tower is produced by abrasion and cracking due to collision of the grains each other at various positions in the cycle line of the adsorbent. Thus, sieving is carried out by installing a vibrating screen, but it is difficult to sufficiently remove a fine powder of about several microns by an ordinary vibrating screen and a large part of the fine powder passes with larger grains. That is, the sum of a powder passing through a vibrating screen and a powder produced from the vibrating screen to the adsorption tower inlet enter the adsorption tower, where a fine powder produced by the movement of the adsorbent is further added, but the quantity of this fine powder is very little because the moving speed of the adsorbent is very low in the adsorption tower. Such a fine powder can well be removed by rinsing out with a gas and accordingly, the powder rinsed and removed in an adsorption tower results in increase of the dust concentration at the outlet of the adsorption tower.

When the dust concentration in a waste gas is not less than the regulation value at the outlet of an adsorption tower, a dust collector must be installed, the size of which is dependent upon the quantity of a waste gas to be processed and in general, substantially similar to that of the adsorption tower. Such a dust collector not only occupies a large space, but also presents large costs for installation and maintenance.

SUMMARY OF THE INVENTION

It is an object of the present invention to provide a dust pre-removal method in an adsorbing tower of the dry moving bed type, whereby the above described problems of the prior art can be solved.

It is another object of the present invention to provide a dust pre-removal method in an adsorption tower of dry moving bed type by installation of a small-sized and low cost apparatus to largely reduce the dust concentration in a waste gas at the outlet of an adsorption tower.

It is a further object of the present invention to provide an adsorption tower of the dry moving bed type, which is provided with a small-sized dust collector for the pre-removal of dust.

These objects can be attained by a dust pre-removal method in an adsorption tower of the dry moving bed type using a granular adsorbent, characterized by previously subjecting the granular adsorbent entering the adsorption tower to rinsing with a gas in a feed pipe of the adsorbent.

BRIEF DESCRIPTION OF THE DRAWINGS

The accompanying drawings are to illustrate the principle and merits of the present invention in greater detail.

DETAILED DESCRIPTION OF THE INVENTION

We, the inventors, have made various efforts to overcome the severe regulation on the dust concentration in a waste gas exhausted in the air and consequently, have arrived at the present invention. Accordingly, the present invention provides a dust pre-removal method in an adsorption tower of the dry moving bed type using a granular adsorbent such as granular carbonaceous adsorbent, characterized by previously subjecting the granular adsorbent entering the adsorption tower to rinsing with a gas in a feed pipe for the adsorbent. In particular, it is preferable to use the gas from the adsorption tower as the above described rinsing gas in a proportion of 0.1 to 5 vol %, preferably 0.3 to 2 vol %, more preferably 0.5 to 0.8 vol. % to the whole volume of the gas to be processed in the tower.

Referring to FIG. 1 again, the principle of the present invention will be illustrated. Hopper 4 and adsorption tower 2 are ordinarily connected by a pipe with an inner diameter of about 150 to 300 mm and a granular adsorbent is moved downward continuously under a packed state in this connection pipe. On the other hand, the inside of adsorption tower 2 is generally held at a pressure of several ten to several hundred mmHg. If a hole is made in the connection pipe, therefore, the gas in the adsorption tower is passed through the connection pipe and discharged in the air from the hole, while during the same time, the adsorbent grains and gas are contacted in the connection pipe to effect rinsing and removing of a fine powder. The principle is as described above, but in practice, the discharge of a gas with a high dust concentration in the air is not permitted by the regulation and it is further required to operate the system in stable manner.

Figure 2A:
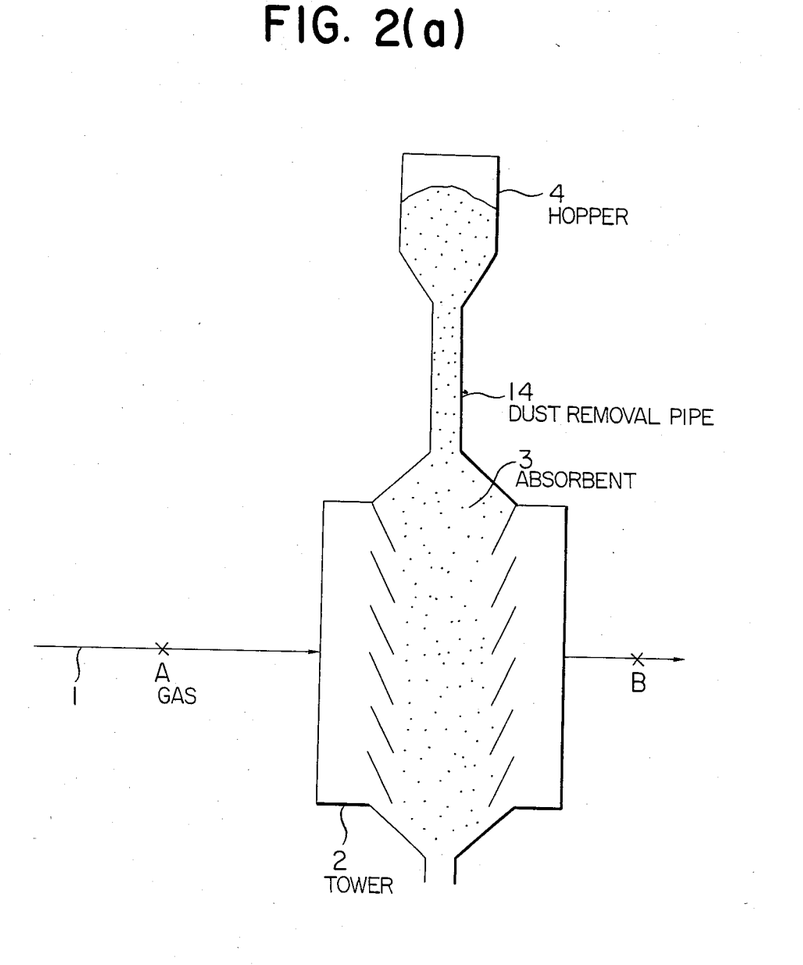
FIGS. 2(a) and (b) are schematic views of flow diagram showing a comparison and one embodiment for practicing the dust pre-removal method according to the present invention respectively.
Figure 2B:
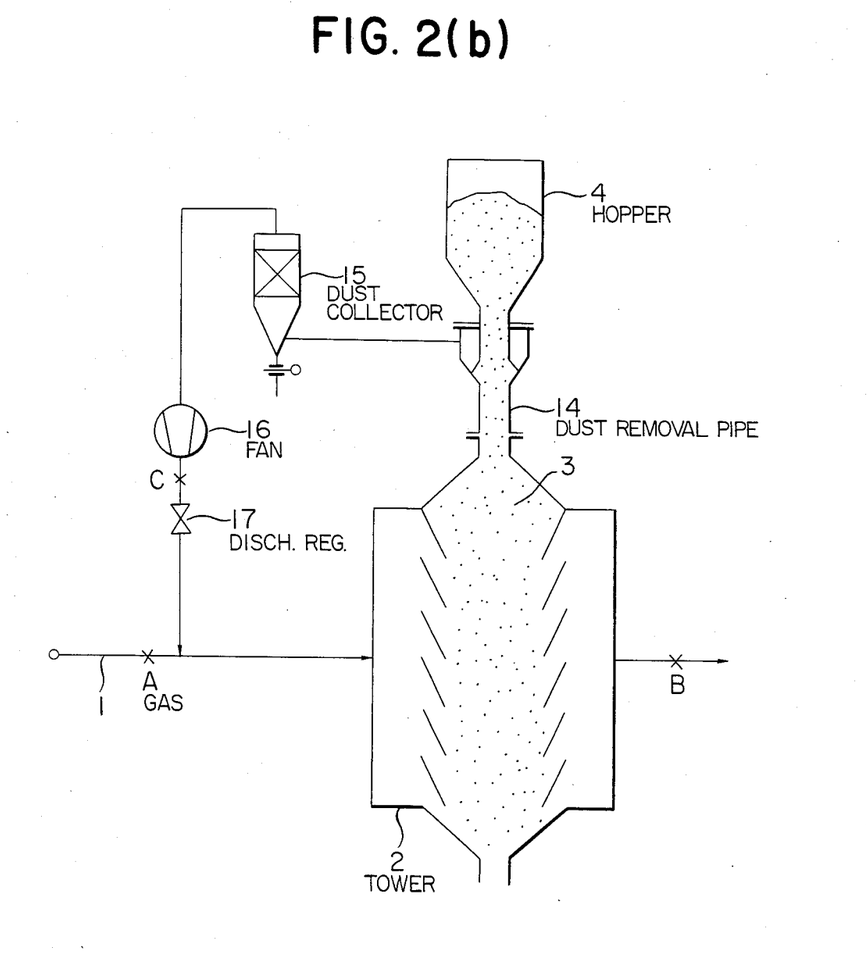

The above described principle of the present invention can be realized, for example, by the use of a system as shown in FIG. 2(b) comprising waste gas 1 from a boiler, etc., adsorption tower 2, granular carbonaceous adsorbent 3, hopper 4, dust removal pipe 14, small-sized dust collector 15, fan 16 and discharge regulator 17. The gas in adsorption tower 2 is sucked by fan 16, moved upward in contact with the adsorbent grains in dust removal pipe 14 and fed to small-sized dust collector 15 with fine powder, where the fine powder is removed. The thus rinsed gas is compressed by fan 16 and then added to waste gas 1 from a boiler, etc. at the inlet of adsorption tower 2. At this time, the flow rate of the gas rising in dust removal pipe 14 must so be controlled that the adsorbent grains moving downward be not fluidized.

The merits or effects of the present invention are summarized below:

(1) Dust removal is very effective because it is carried out at the nearest position to an adsorption tower, i.e. at the inlet of an adsorption tower.

(2) When a part of the gas in an adsorption tower is used for rinsing and then returned again to the adsorption tower, feeding of another gas to the system and withdrawing of it therefrom can be omitted and contamination of the system with another gas can be avoided.

(3) The dust collector and fan may each be of a small size. In the case of a carbonaceous adsorbent for the removal of $SO_x$ and $NO_x$ by dry process, the capacity thereof, depending upon the processing conditions, is generally about 100 $Nm^3/h$ for a connection pipe with a diameter of 200 mm.

(4) Since the amount of the gas is small as described above, the increased portion of the gas passing through the adsorption tower by circulation is negligible so that the processing for the removal of $SO_x$ and $NO_x$ is hardly affected.

(5) The size of the dust collector may have a length of about 1 m as described in Item (3) and thus results in a compact system.

(6) It is not required to use expensive materials for the above described devices or apparatus, since the gas introduced into the small-sized dust collector and fan is purified, for example, as to the content of $SO_x$ to a considerable extent and its flow rate is so small that the temperature control can readily be effected.

The following examples are given in order to illustrate the present invention in detail without limiting the same.

EXAMPLE 1

Using apparatus as shown in FIG. 2-(a) for comparison and FIG. 2-(b) according to the present invention, a waste gas was subjected to removal of $SO_x$ and dust at a gas flow rate of 1000 $Nm^3/hr$ under the conditions tabulated below:

TABLE 1

|  | FIG. 2 (a) | FIG. 2 (b) |
| --- | --- | --- |
| Point A Dust Concentration $mg/Nm^3$ | 220 | 220 |
| Point A $SO_x$ Concentration ppm | 1000 | 1000 |
| Point B Dust Concentration $mg/Nm^3$ | 70 | 15 |
| Point B $SO_x$ Concentration ppm | 100 | 100 |
| Point C Gas Flow Rate $Nm^3/hr$ | — | 25 |

It is apparent from these results that the dust concentration at Point B is considerably reduced in the case of FIG. 2(b) according to the present invention.

EXAMPLE 2

Figure 3:
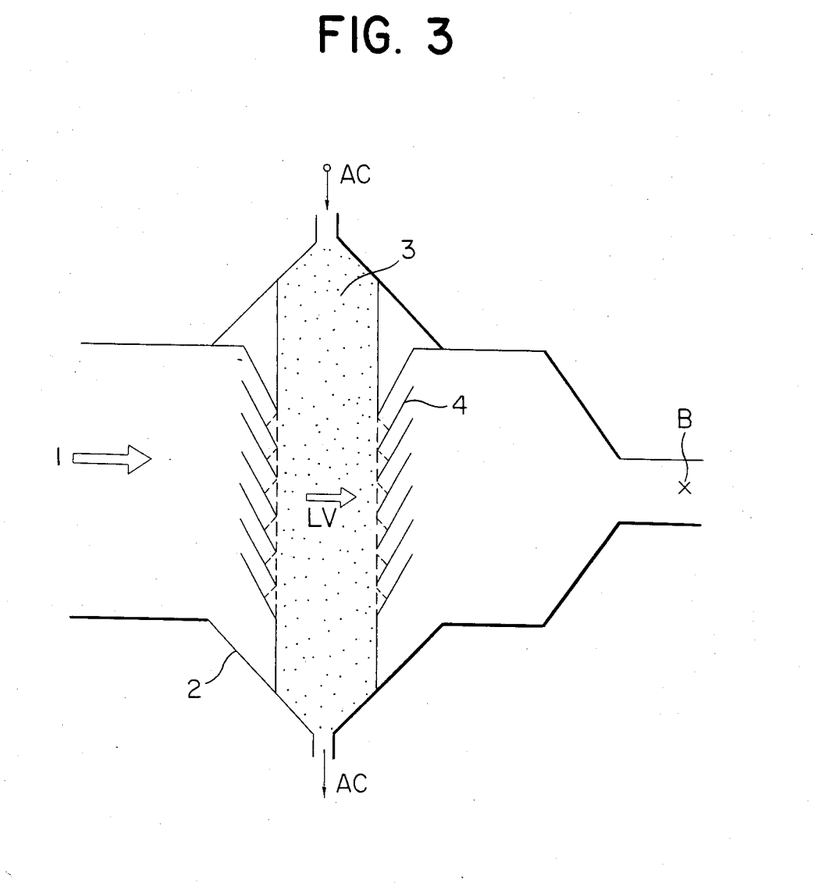
FIG. 3 is a schematic view of a dry moving bed type adsorber for practicing a fundamental experiment relating to the present invention.

A fundamental experiment was carried out using an apparatus as shown in FIG. 3. This experiment was carried out so as to know the relationship between the linear velocity LV of a gas in adsorption bed 2 and the quantity of dust entrained therewith (measured at point B) using a boiler waste gas having a moisture content of 12 vol %, $SO_2$ content of 1000 ppm (DB) and $NO_x$ content of 180 ppm (DB) at 130° C., and an activated coke (AC) as the adsorbent.

Figure 4:
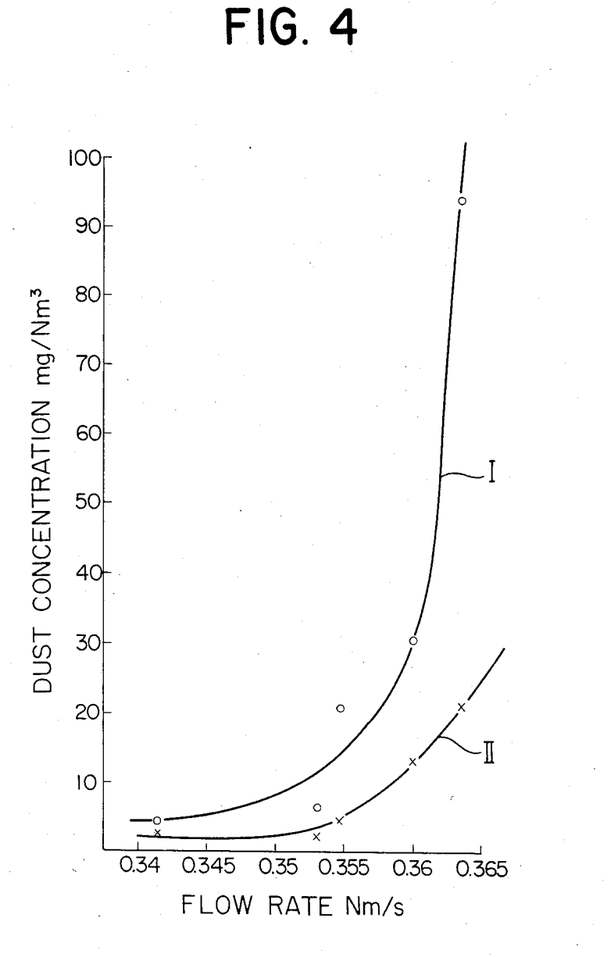
FIG. 4 is a graph showing the relationship between the gas flow rate and dust concentration resulting from the fundamental experiment.

The results are shown in FIG. 4, in which Curve I shows all the dusts collected and Curve II shows a case of compensating salts, i.e. a value after washing out all the above described dusts with water and removing water-soluble components consisting predominantly of reaction products between $SO_2$ and $NH_3$ in the adsorption bed.

It is apparent from these results that the dust concentration rises rapidly at a flow rate of higher than a certain value and in particular, the dust concentration changes rapidly with a slight change of flow rate. This is due to that the dust in AC layer consists mainly of a powder with a grain size of larger than a certain value and the dust concentration thus changes rapidly at the flow rate capable of blowing such a powder off.

EXAMPLE 3

Figure 5:
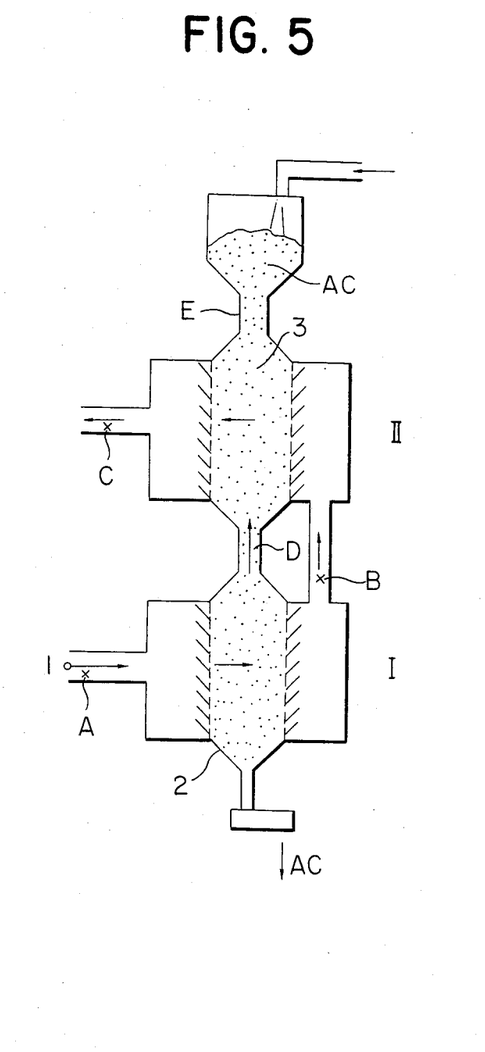
FIG. 5 is a schematic view of an adsorption tower of dry moving bed and two-tower type for practicing a fundamental experiment relating to the present invention.

A similar experiment to that of Example 2 was carried out using an apparatus as shown in FIG. 5 and the dust concentrations were measured at points A, B and C. All dust concentrations $mg/Nm^3$ at these points are shown in Table 2 (average values of measurements of 6 times):

TABLE 2

|  | A | B | C |
|---|---|---|---|
| Dust Concentration $mg/Nm^3$ | 208 | 14 | 56 |

In these results, it is noted that the dust concentration is lower at Point B. This is due to that AC moving downward is rinsed with the leakage gas rising upward at Point D and the dust present in Tower II is prevented from entrance into Tower I. The gas linear velocity at Point D was about 0.7 to 0.9 Nm/sec. Furthermore, it will clearly be understood that the most part of the dust contained in the gas at Point A is removed by AC in Tower I. The relatively higher dust concentration at Point C can be explained by the fact that a fine powder in AC formed up to Tower II is entrained with the gas in Tower II.

EXAMPLE 4

Figure 6A:
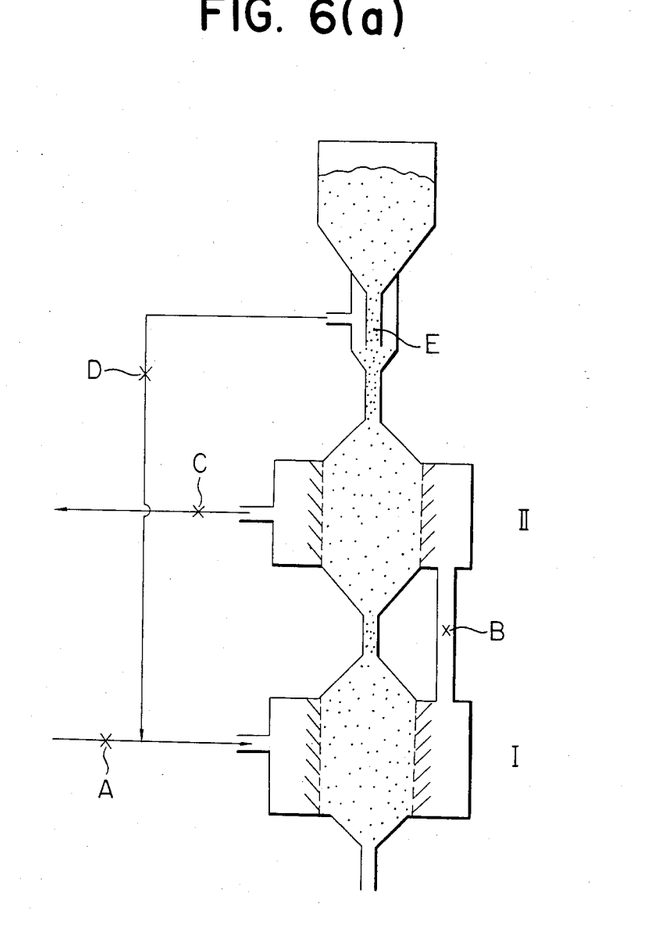
FIGS. 6(a) and (b) are schematic views of adsorption towers showing other embodiments of the present invention.

A similar experiment to that of Example 3 was carried out using an apparatus as shown in FIG. 6(a) and the dust concentrations were measured at Points A, B, C and D. All dust concentrations $mg/Nm^3$ at these points are shown in Table 3 (gas flow rate: 1000 $Nm^3/h$):

TABLE 3

|  | A | B | C | D |
|---|---|---|---|---|
| Dust Concentration $mg/Nm^3$ | 130 | 40 | 27 | 5000 (125)* |
| Flow Rate $Nm^3/h$ | 1000 | 1000 | 1000 | 25 |

Note:
converted at 1000 $Nm^3/h$

In these results, it is noted that the dust concentration at Point D has a higher value, i.e. 125 $mg/Nm^3$ as the converted value at 1000 $Nm^3/h$. This is due to that AC contains a very large quantity of fine powder to be removed at the inlet of Tower II, which will increase the dust concentration at Point C unless removed, and the fine powder is effectively removed according to the present invention.

EXAMPLE 5

Figure 6B:
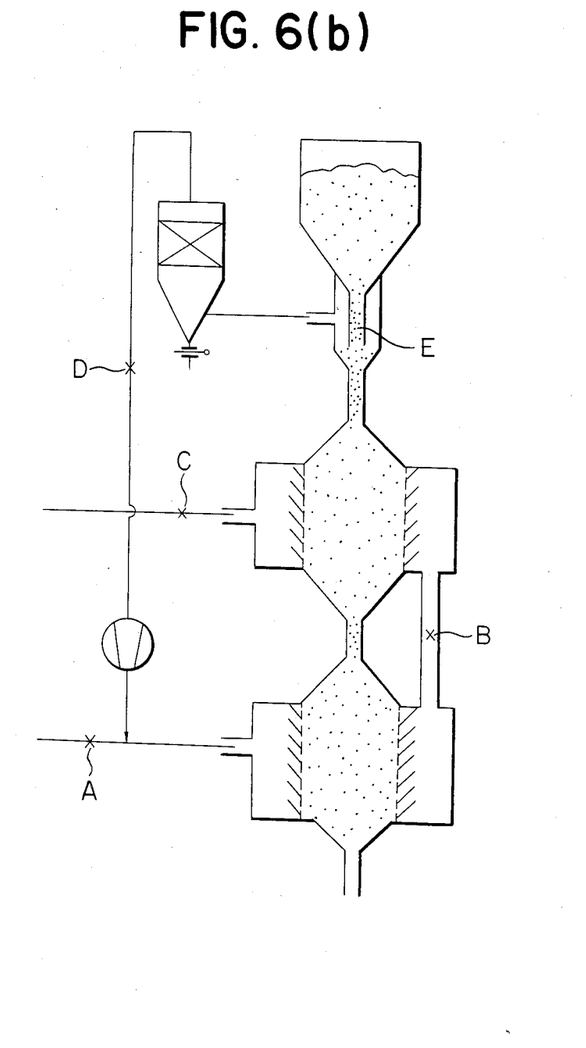

A similar experiment to that of Example 3 was carried out using apparatus as shown in FIG. 5 and FIG. 6(b) and the dust concentrations were measured at Points A, B, C and D. The reaction conditions and results are shown in Table 4 (gas flow rate: 1000 $Nm^3/h$):

TABLE 4

|  | FIG. 5 | FIG. 6 (b) |
|---|---|---|
| Point A Gas Flow Rate $Nm^3/h$ | 1000 | 1000 |
| Point A $SO_2$ Conc. ppm | 1000 | 1000 |
| Point A $NO_x$ Conc. ppm | 180 | 180 |
| Point A Gas Temp. °C. | 130 | 130 |
| Point A Moisture Conc. % | 12 | 12 |
| Point C $SO_2$ Conc. ppm | 0 | 0 |
| Point C $NO_x$ Conc. ppm | 36 | 36 |
| $SO_x$ Removal % | 100 | 100 |
| $NO_x$ Removal % | 80 | 80 |
| Point A Dust Conc. $mg/Nm^3$ | 208 | 210 |
| Point B Dust Conc. $mg/Nm^3$ | 14 | 15 |
| Point C Dust Conc. $mg/Nm^3$ | 56 | 13 |
| Point D Dust Conc. $mg/Nm^3$ | — | 5 |
| Point D Gas Flow Rate $Nm^3/h$ | — | 25 |
| Dust Removal % | 73 | 94 |

As is evident from these data, the dust concentration at Point C in the case of FIG. 6(b) of the present invention is remarkably reduced as compared with that at Point C in the case of FIG. 5.

What is claimed is:

1. In a dust pre-removal method in an adsorption apparatus of the dry moving bed type for purifying a gas, which apparatus comprises an adsorption tower having an upper and lower part and a hopper for feeding a dry granular adsorbent comprising carbonaceous grains downwardly to the upper part of said tower, in which adsorption tower a granular adsorbent is moved downwardly to form vertical flow and a waste gas is passed transversely through the vertical flow of the granular adsorbent, the improvement which comprises providing a pipe between said hopper and upper part of said tower, said pipe having an inlet for receiving said granular adsorbent from said hopper, an outlet for discharging said granular adsorbent to the upper part of said tower and a further outlet for removal of dust from said granular adsorbent and wherein a portion of said gas purified in said adsorption tower rinses said granular adsorbent in said pipe and wherein said granular adsorbent dust is removed through said further outlet, the flow rate of said purified gas through said pipe being such as to not fluidize the downwardly flowing granular adsorbent in said pipe.

2. The method according to claim 1 wherein a small dust collecting system is provided to receive and collect dust from said further outlet.

3. The method according to claim 2 wherein said small dust collecting system comprises a pipe communicating with said further outlet, a fan for withdrawing dust from said pipe communicating with said further outlet and a discharge regulator communicating with said fan for regulating the rate of withdrawal of said dust.

4. In an adsorption apparatus of the dry moving bed type for purifying a gas, which apparatus comprises an adsorption tower having an upper and lower part and a hopper for feeding a dry granular adsorbent comprising carbonaceous grains downwardly to the upper part of said tower, in which adsorption tower a granular adsorbent is moved downwardly to form a vertical flow and a waste gas is passed transversely through the vertical flow of the granular adsorbent, the improvement which comprises a pipe between said hopper and upper part of said tower, said pipe having an inlet for receiving said granular adsorbent from said hopper, an outlet for discharging said granular adsorbent to the upper part of said tower and a further outlet for removal of dust from said granular adsorbent and wherein a portion of said gas purified in said adsorption tower rinses said granular adsorbent in said pipe and wherein said granular adsorbent dust is removed through said further outlet, the flow rate of said purified gas through said pipe being such as to not fluidize the downwardly flowing granular adsorbent in said pipe.

5. The apparatus according to claim 4 wherein a small dust collecting system is provided to receive and collect dust from said further outlet.

6. The apparatus according to claim 5 wherein said small dust collecting system comprises a pipe communicating with said further outlet, a fan for withdrawing dust from said pipe communicating with said further outlet and a discharge regulator communicating with said fan for regulating the rate of withdrawal of said dust.

* * * * *